United States Patent [19]

Knetsch et al.

[11] Patent Number: 5,133,944
[45] Date of Patent: Jul. 28, 1992

[54] METHOD AND DEVICE FOR THE CATALYTIC CLEANING OF EXHAUST GASES OF INTERNAL COMBUSTION ENGINES

[75] Inventors: Dieter Knetsch, Reichenbach; Thomas Ullmann, Hohengehren, both of Fed. Rep. of Germany

[73] Assignee: J. Eberspächer, Esslingen, Fed. Rep. of Germany

[21] Appl. No.: 322,766

[22] Filed: Mar. 13, 1989

[30] Foreign Application Priority Data

Mar. 18, 1988 [DE] Fed. Rep. of Germany ....... 3809105

[51] Int. Cl.$^5$ ............................................. B01J 15/00
[52] U.S. Cl. .................................... 422/180; 29/890; 422/177
[58] Field of Search ..................... 422/177, 180, 181; 156/184, 187, 191, 192; 29/890, 447, 163.6, 163.7, 163.8

[56] References Cited

U.S. PATENT DOCUMENTS

| | | | |
|---|---|---|---|
| 4,521,947 | 6/1985 | Nonnenmann et al. | 422/181 |
| 4,647,435 | 3/1987 | Nonnenmann | 422/180 |
| 4,719,680 | 1/1988 | Cyron | 422/180 |
| 4,832,998 | 5/1989 | Cyron | 428/116 |
| 4,923,109 | 5/1990 | Cyron | 422/180 |

FOREIGN PATENT DOCUMENTS

2720322  9/1978  Fed. Rep. of Germany ...... 422/180

*Primary Examiner*—Jill A. Johnston
*Attorney, Agent, or Firm*—McGlew & Tuttle

[57] ABSTRACT

A catalyst carrier body of flat and corrugated metal strips is arranged in layers mounted in a metallic housing which can be easily manufactured and is suitable for mechanical and thermal stresses, as well as a process for its manufacture. The catalyst carrier comprises an anti-clockwise folded coil form which is pressed into the desired final shape and is encased in a metallic jacket.

9 Claims, 2 Drawing Sheets

METHOD AND DEVICE FOR THE CATALYTIC CLEANING OF EXHAUST GASES OF INTERNAL COMBUSTION ENGINES

FIELD AND BACKGROUND OF THE INVENTION

The invention relates in general to exhaust gas treatment devices and in particular to a new and useful device for catalytic cleaning of exhaust gases of an internal combustion engine, which has a metallic catalyst carrier of flat and corrugated metal strips arranged in layers and mounted in a metallic housing, and a method for its manufacture.

Similar catalyst carrier bodies, mounted in a metallic housing, are known, e.g. from German laid-open specification 23 02 746, according to which a plain and a corrugated strip are brought together and wound together so that a catalyst body is created in which the strips are wound spirally around a core. This arrangement has the considerable disadvantage, in particular that because of the pulsation of the exhaust gas the core is forced out, so that a conical deformation takes place in the direction of the axis.

In addition, a catalyst carrier body is known from EURO application 245 737, in which the forcing out of the core is delayed. In this known arrangement, the catalyst carrier body is formed in such a manner that in a stack of textured sheets, the ends are interlaced in an opposite direction around two fixed points, and a jacket is slipped over this coil form. According to the process therein disclosed, bodies of different shapes can be formed, with the starting point in each case being a stack of textured sheets, and manufacture takes place over fixed points determined in advance, with forks or similar devices engaging in the fixed points. In the case of special shapes, e.g. for oval catalyst carrier bodies, it is necessary to work with separately produced filling bodies which are inserted into the wound body. Though the danger of the body being forced out, or its being deformed in the axial direction is reduced in this arrangement, the danger is not completely avoided, with deformation occurring especially then when the individual wound layers are undetachably connected to the jacket, e.g. by soldering. This is carried out with a geometrical, strictly symmetrical structure.

SUMMARY OF THE INVENTION

It is the purpose of the invention to provide a catalyst carrier body, which is simple in structure and by its geometry is secure against bulging out in the direction of pressure, is firmly held in the jacket serving as a housing, and with which different constructions can be achieved with the same prefabricated coil form.

According to the invention, the catalyst carrier body comprises an over-wound anticlockwise folded coil form inserted into a metallic housing and shaped to fit the specified housing cross-section. In this respect, oval is to be understood as the generic term for various shapes, the characteristic of which is the longitudinal extension of the coil form. Thus, the following shapes, for example, are to be understood as oval-shaped: Semicircular end sections with an intervening section with parallel running channels, to wit, a rectangle in section, the opposite short sides of which form semicircles, or a form with semicircular ends and an intervening convex or concave section, or a rectangle with rounded corners, and many others. In a preferred exemplification, the coil form described to be oval-shaped is created by winding the strip stacked in layers — one corrugated, one flat strip — over two cores arranged at a distance to one another. The thusly created coil form has a length to width ratio of 1:4 to 1:8. Winding according to the invention can, of course, also be done over several cores, depending on the specified final shape of the catalyst carrier body.

It has been found that in the catalyst carrier body of the invention, transverse lamina will appear, because of the parallel sections of the coil form, which transverse lamina provide extraordinary stability against bulging.

The catalyst carrier body according to the invention is manufactured in a particularly advantageous manner by means of the following process steps:

First, the winding takes place of the superposed flat and corrugated metal strips into an oval coil form, then there is effected an anticlockwise folding of this coil form into a wave shape — e.g. an S-shape or a meander shape. Thereafter, a pressing into a specified final shape takes place and finally the final shape is inserted into a metallic jacket which serves as a housing.

The winding for the coil form described as oval-shaped takes place, for example over two cores arranged at a distance from one another on a rotating disk. The strips to be wound together, a flat strip on a corrugated strip, can be fed as separately manufactured, cut-to-length and superposed strips.

According to a particularly advantageous process, the corrugated strip and the flat strip are produced in one place and one strip is folded onto the other strip. The winding process then starts at the fold. In the case of separately produced strips, they do not have to be joined to each other, although it is certainly also possible to join the flat to the corrugated strip undetachably by soldering or by other known spot welding joints, e.g. at each tenth or thirtieth corrugation, with one or more points across the width of the strip. For winding, the two strips are placed over one of the cores and, by rotating the disk with the cores, the coil form is produced.

In view of the thereupon following folding it is advantageous to wind relatively loosely. In the aforesaid example, an oval-shaped coil form is created by winding over two cores. This basic shape is especially well suited for wound catalyst carrier bodies. The coil form produced as described, which in a preferred specific embodiment has a length to width ration of 1:4 to 1:8 with 10 to 20 wound layers, is then brought through an anticlockwise folding into an at least approximate wave shape, in the simplest case as S-shape. The thusly deformed coil form is then pressed into the specified shape, e.g. into a round catalyst carrier body. This can be done in a simple tool, in which two semicircular jaws, between which the loosely coated coil form is inserted, are brought together to a circular cross-section and thereby bring the folded coil form into the final shape. It is important that this be done anticlockwise and that the coil form is inserted and deformed for pressing into the described shape.

In an oval shape of the catalyst carrier body, the mold is correspondingly oval-shaped. In this regard, oval is to be understood as approximately elliptical in section Other symmetrical or also nonsymmetrical sections of the catalyst carrier body, e.g. a banana shape, can also be obtained in this simple manner. Lastly, there takes place the insertion of the shaped coil form into a metallic jacket. This is done, e.g. by using a prefabricated and appropriately cut-to-length jacket, e.g. a length of pipe. The jacket is set up on the pressing tool and the coil form is inserted into the pipe by a tappet or piston. Through the pretension occurring during the pressing of the coil form into the final shape, a secure hold is effected in the jacket. It is also possible, for catalyst carrier bodies stressed particularly through pulsation, to join the coil form with the jacket undetachably in a known manner, through soldering or spot welding.

Accordingly, it is an object of the invention to provide a device for the catalytic cleaning of exhaust gases of an internal combustion engine and which comprises a metallic housing with a metallic catalyst body in the housing made up of a flat strip and a corrugated metal strip arranged in layers one upon the other and mounted in the housing and wherein the catalyst carrier body is an oval-wound counterclockwise folded coil form which is shaped to fit the specified housing cross-section.

An object of the invention is to provide a catalytic cleaning device which is rugged in construction and economical to manufacture.

A further object of the invention is to provide a method of forming a catalytic cleaning device which comprises winding a corrugated and a flat strip of metal into an oval coil form, folding the form after it has been formed and pressing it into a cylindrical body which forms an outer metal jacket.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

Figure 1:
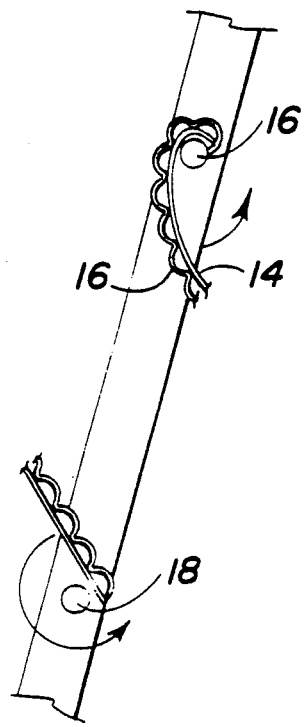
FIG. 1 is a schematic showing of the winding of the plain and corrugated strips to form an oval form.
Figure 2:
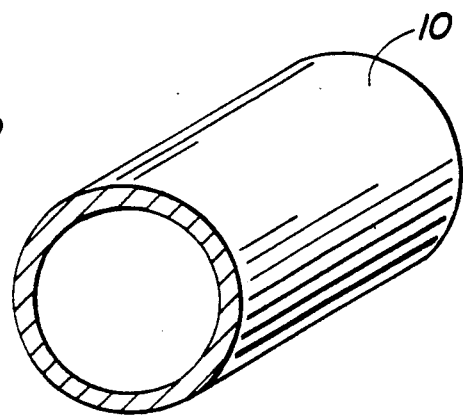
FIG. 2 is a perspective view of a tubular housing used to receive the form formed in FIG. 1.

Referring to the drawings in particular, the invention embodied therein comprises a device for the catalytic cleaning of exhaust gases of an internal combustion engine which includes a metallic housing 10 into which is positioned a metallic catalyst body 12 which is made up of a flat sheet 14 and a corrugated sheet 16 which as shown in FIG. 1 as schematically being formed into an oval form by forming the superposed, layers, over spaced 16 and 18 for example. After forming of the sheets 14 and 16 into an oval form after wrapping the body 12 around separate areas the oval form is then bent into the shape shown in FIG. 3 where the best shaped form is compressed into the housing 10. Preferably the sheets are formed into an oval coil on the supports 16 and 18 and then the oval coil structure is folded in a counterclockwise manner into an approximately wave shaped configuration. The body is pressed into a specified wave shape and inserted into the jacket 10 which in the embodiment shown is cylindrical but may be rectangular or any other form.

Advantageously, the straight sheet 14 and the corrugated strip 16 are produced in a single piece with one strip being folded onto the other strip to provide the body 12.

Advantageously, the winding of the oval coil forms on the supports 16 and 18 takes place at a length to width ratio of 1:4 up to 1:8 and preferably 1:6.5.

Advantageously, the flat strip and the corrugated strip are joined to each other at several points.

Figure 3:
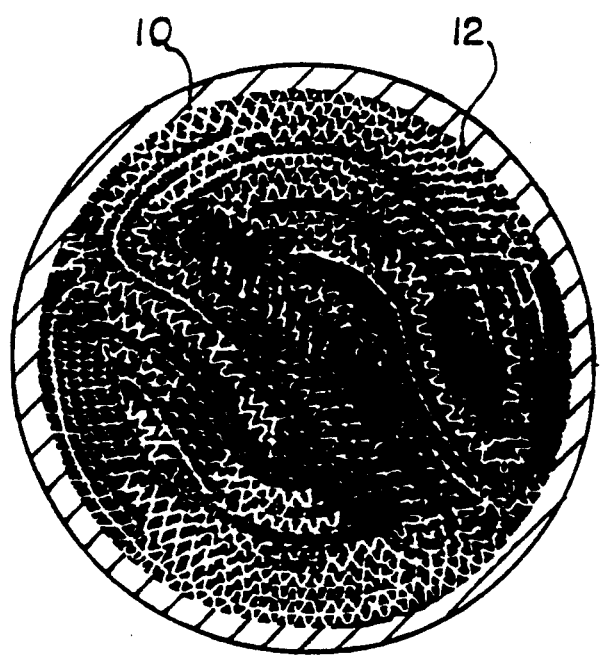
FIG. 3 is an end elevational view of a folded oval form of plain and corrugated sheets which are superposed.

FIG. 3 is shows a catalyst carrier body. The illustration clearly shows the transverse lamina, through which a particularly great stability against bulging is obtained; it also shows that the design is not strictly symmetrical, with the deviation from rotational symmetry being the greater, the more irregular the anticlockwise folding. For the coil form shown, a double layer strip, one corrugated, one flat, each 2.75 m long, was wound in 15 layers over two cores 125 mm distant from each other. The resulting oval coil form had a width to length ratio of about 1:6.5 while the width of the strip was 75 mm. The finished catalyst carrier body had a length of 80 mm, i.e. 2.5 mm projecting edge of the jacket per side, and a diameter of 790 mm. This catalyst carrier body has proved itself very well under all occurring stresses of a mechanical or thermal nature; substantially larger and smaller catalyst carrier bodies were also produced in the described manner and tested and showed no deformations or defects.

What is claimed is:

1. A device for the catalytic cleaning of exhaust gases of an internal combustion engine, comprising: a metallic housing; a flat metal strip and a corrugated metal strip, said corrugated metal strip being superimposed on said flat strip to form a metallic catalyst body having a first end corresponding to a first end of said flat metal strip and a first end of said corrugated strip and having a second end corresponding to a second end of said flat metal strip and a second end of said corrugated metal strip, said metallic catalyst body being continuous from said first end to said second end, said metallic catalyst body being wound in a substantially oval shaped coil, said oval coil being bent back on itself at a top coil end in one direction and bent back upon itself at a bottom coil end in a second direction to form a folded coil structure, said folded coil structure being positioned within said metallic housing.

2. A device according to claim 1, wherein said oval coil is formed of from 10 to 20 windings of said metallic body.

3. A device according to claim 1, wherein said oval coil includes a first metallic catalyst body reversal point at a first oval end and a second metallic catalyst body reversal point at a second oval coil end, said catalyst body being bent back upon itself at said reversal points and being compressed together.

4. A device according to claim 1 wherein said flat strip and said corrugated strip are formed as an integral element with one half of said integral element folded over another half to form said metallic catalyst body.

5. A device for the catalytic cleaning of exhaust gases of an internal combustion engine, formed by the steps of: positioning a straight, flat metal sheet and a corrugated metal sheet, one above the other to form a metallic catalyst body which is continuous from a first metallic catalyst body end to a second metallic catalyst body end; winding said metallic catalyst body about two points spaced a distance apart to form an oval shaped coil body with said metallic catalyst body first end being on an interior side of said oval shaped body and said metallic catalyst body second end being on an exterior side of said oval shaped coil body, said oval shaped coil body having a first oval shaped coil body end formed adjacent said first reversal point and a second oval shaped coil body end formed adjacent said second reversal point; folding said oval shaped coil body and folding said oval shaped coil body second end in a second direction back upon said oval shaped coil body to form a substantially S-shaped body and compressing said substantially S-shaped body to form a compressed substantially S-shaped body; and positioning said compressed substantially S-shaped body in a metallic housing.

6. A device formed according to claim 5, wherein said metallic catalyst body is formed from a single continuous sheet, at least one half of said continuous sheet being corrugated to form a corrugated portion with the remainder of said sheet being formed flat to provide a flat portion, said metallic catalyst body being formed by folding the corrugated portion onto to the flat portion.

7. A device formed according to claim 5, wherein said step of forming an oval shaped member includes providing two separate cores positioned at spaced locations, said metallic catalyst body being extended from one core to another and coiled around said cores.

8. A device formed according to claim 5, wherein said oval shaped coil body is formed with a length to width ratio of from 1:4 up to 1:8.

9. A device formed according to claim 5, wherein said flat sheet and said corrugated metal strip are firmly joined together at several points along their length.

* * * * *